US012732418B2

(12) United States Patent
Simone et al.

(10) Patent No.: US 12,732,418 B2
(45) Date of Patent: Sep. 8, 2026

(54) IMPLEMENTING ENTERPRISE-SCALE SERVICE MESH

(71) Applicant: Twilio Inc., San Francisco, CA (US)

(72) Inventors: Daniel Karl Simone, Newtown, PA (US); Gokul Ramesh, San Francisco, CA (US)

(73) Assignee: Twilio Inc., San Francisco, CA (US)

(*) Notice: Subject to any disclaimer, the term of this patent is extended or adjusted under 35 U.S.C. 154(b) by 0 days.

(21) Appl. No.: 18/888,493

(22) Filed: Sep. 18, 2024

(65) Prior Publication Data

US 2026/0081823 A1 Mar. 19, 2026

(51) Int. Cl.
*H04L 41/0803* (2022.01)
*H04L 9/32* (2006.01)
*H04L 61/4511* (2022.01)

(52) U.S. Cl.
CPC ........ *H04L 41/0803* (2013.01); *H04L 9/3263* (2013.01); *H04L 61/4511* (2022.05)

(58) Field of Classification Search
CPC . H04L 41/0803; H04L 9/3263; H04L 61/4511
See application file for complete search history.

(56) References Cited

U.S. PATENT DOCUMENTS 9,462,427 B2 * 10/2016 Patel .................. G06F 9/45558
10,613,914 B2 * 4/2020 Carlen .................. H04L 69/40
11,343,247 B1 * 5/2022 Ozarkar .................. H04L 67/56
11,586,752 B1 * 2/2023 Ozarkar .................. H04L 9/083
12,068,958 B1 * 8/2024 Henkel ............... H04L 61/4541
2020/0358802 A1 * 11/2020 Viswambharan ... H04L 63/1433
2022/0116445 A1 * 4/2022 Filippou ............. H04L 41/0803
2022/0342707 A1 * 10/2022 Alagna ............... H04L 67/1097
2022/0413936 A1 * 12/2022 Elliott ................ G06F 9/45558
2024/0205198 A1 * 6/2024 Sood ..................... H04L 9/3268
2024/0265138 A1 * 8/2024 Yannuzzi .............. G06F 21/629
2024/0406216 A1 * 12/2024 Quiros .................. H04L 67/101
2024/0406277 A1 * 12/2024 Henkel ............... H04L 61/4511
2024/0430338 A1 * 12/2024 Mestery ............. H04L 61/4511
2025/0383860 A1 * 12/2025 Maier ....................... G06F 8/65

* cited by examiner

Primary Examiner — Richard G Keehn
(74) Attorney, Agent, or Firm — Lowenstein Sandler LLP

(57) ABSTRACT

A communication services platform implemented by a distributed computing system may include a plurality of container orchestration instances (COIs), such that a first COI of the plurality of COIs includes a plurality of running instances of a first service accessible via a first mesh proxy and a first mesh controller. The first mesh controller is configured to: publish a first service configuration record for the first service, receive a second service configuration record for a second service running in a second COI of the plurality of COIs, and translate the second service configuration record into one or more custom resource definitions to allow upstream service calls by the second service to the first service.

19 Claims, 9 Drawing Sheets

IMPLEMENTING ENTERPRISE-SCALE SERVICE MESH

TECHNICAL FIELD

Aspects and implementations of the disclosure relate to computer networking, and more specifically, to systems and methods for implementing enterprise-scale service mesh.

BACKGROUND

A communication service platform may employ a mesh-based architecture for implementing one or more functional modules or the platform itself. The mesh-based architecture may be implemented by an infrastructure layer that provides zero-trust security, observability, and advanced traffic management for one or more services.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Figure 1:
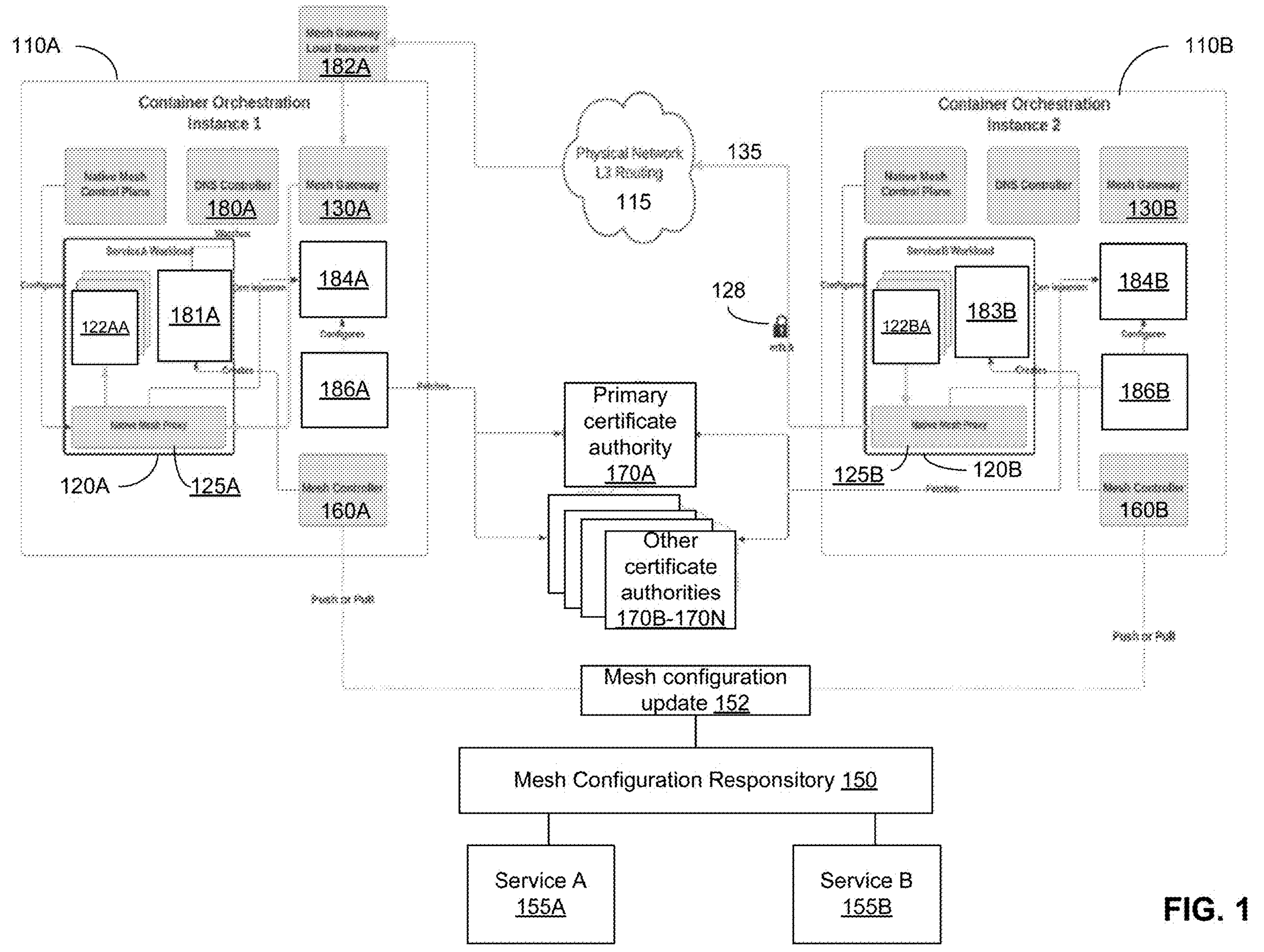
FIG. 1 illustrates an example distributed mesh system, in accordance with aspects of the disclosure.

Various organizations have been increasingly adopting messaging as a valuable tool for communications within and outside of the organization. In an example use case, an organization may use messaging to forward to client devices of its end users one-time passwords for a two-factor authentication scheme. In another example use case, an organization may use messaging to send promotional messages to client devices of its end users. In yet another example use case, an organization may use messaging to send appointment reminders to client devices of its end users and may further request the message receiver to reply to either confirm or cancel an appointment.

In these and various other use cases, organizations may employ communication services platforms, such as Software as a Service (SaaS) platforms, which facilitate sending of messages (such as SMS messages, MMS messages, and/or IM messages) generated by multiple message originating entities ("customers" of the communication services platform) to recipient devices via multiple message routing providers.

In some implementations, a communication service platform may employ a mesh-based architecture for implementing one or more functional modules or the platform itself. The mesh-based architecture may be implemented by an infrastructure layer that provides zero-trust security, observability, and advanced traffic management for one or more services.

"Service" herein refers to one or more software modules, deployed with a particular configuration for delivering a particular functionality. A service may be implemented by multiple running instances of the software, all of which perform the same task. Examples of services include: a web server running a web application; an instance of a database engine; or a worker program processing items from a queue. A service instance may be employed in a dedicated run-time environment, such as a physical or a virtual node. "Virtual node" here may be a virtual machine or a container.

In some implementations, runtime environments for services and other containerized workloads may be provided by a container orchestration system. An enterprise may maintain multiple instances of one or more container orchestration systems ("container orchestration instances").

Inter-service communication in a given container orchestration instances (COI) may be facilitated by a service mesh, which is a software layer that provides abstraction allowing the services to communicate to each other. A service may be exposed to the world outside the COI by a service mesh gateway, which may include one or more software modules running within the COI and a cloud load balancer component.

A container orchestration system may further facilitate scalability of the run-time environments for running services and/or other containerized workloads and services. However, regardless of the mesh capabilities and other characteristics, a given COI may only scale up to a certain number of compute nodes, thus necessitating splitting the workloads over multiple COIs should a large number of compute nodes be required. Certain other considerations, such as, e.g., separation of concerns and/or blast radius isolation may also warrant splitting the workloads over multiple COIs.

Furthermore, certain service mesh technologies require the mesh control planes of all COIs being able to communicate with each other directly in order to discover their respective states. Such an approach creates multiple close couplings that need to be maintained, thus also hindering scalability. Furthermore, even if a fully connected mesh is created under these limitations, it would be forced to rely upon a global routing table.

Moreover, using a large-scale mesh that involves multiple inter-connected mesh control places may adversely affect the safety of deployment, configuration, and maintenance safe, since as an issue in one part of the mesh would be capable of being quickly propagated to other parts of the mesh.

Besides, running different services within different cloud provider security perimeters or on different cloud platforms may hinder the inter-services communications.

Additionally, a service mesh technology may facilitate service discovery thus allowing services and other components running in disparate computing environments to discover each other. However, implementing the service discovery via a centralized service catalog would create a global runtime dependency which may become a single point of failure.

Finally, communications within the service mesh may need to be secured, which may require issuing digital certificates and public/private key pairs to the communicating parties. While each COI may be able to configure its root certificates, establishing global trust relationships across multiple COIs may present various design and implementation challenges. For example, copying the root certificates across many COIs increases the security blast radius, not to mention the exponential dependency of the number of transmissions on the number of COIs. An alternative solution, i.e., configuring mutual trust relationships between multiple COIs, would not require copying the root certificates across all COIs, but would still be prone to the same type of scalability issues.

Aspects of the present disclosure address the above-mentioned and other challenges by implementing an example distributed mesh system based on multiple loosely-coupled meshes, each one isolated to its COI. Each may run a respective mesh controller, which may facilitate automatic propagation of configuration changes across the mesh architecture while keeping the COIs decoupled from each other. In some implementations, a mesh controller may effectively restrict access to workloads based on the respective service configurations.

Service registration and discovery in the example distributed mesh system may be facilitated by the Domain Naming System (DNS) implemented by a DNS controller residing within each COI. The DNS controller identifies the services to be exposed and registers corresponding DNS entries within a DNS domain associated with the distributed mesh system.

Cross-service authentication and secure communication in the example distributed mesh system may be facilitated by the identity framework implementations managed by the corresponding identity framework controllers, thus allowing each COI to maintain its respective trust domain. In an illustrative example, the identity framework implementation may employ Mutual Transport Layer Security (mTLS), which relies on asymmetric cryptography to prove the identity of the sender and recipient of a message, as well as assert that the message has not been viewed or modified in transit by a third party. Accordingly, the identity framework implementation may attest the identity of workloads in a distributed software system at runtime based on workload-specific, short-lived, automatically rotated cryptographic keys and certificates, as described in more detail herein below.

Thus, the present disclosure addresses the technical problem of scalability of distributed computing systems. A technical solution to the above-identified technical problem involves maintaining a distributed mesh system based on multiple loosely-coupled meshes, each one isolated to its COI. Another technical solution to the above-identified technical problem involves implementing, in each COI, a respective mesh controller facilitating automatic propagation of configuration changes across the mesh architecture while keeping the COIs decoupled from each other. Another technical solution to the above-identified technical problem involves employing, in each COI, a respective identity framework implementation managed by an identity framework controller, thus allowing each COI to maintain its respective trust domain. Another technical solution to the above-identified technical problem involves employing the, in each COI, a respective DNS controller performing service registration and discovery.

Thus, the technical effect includes the decoupled nature of the example distributed mesh system, which allows to avoid various scaling concerns involved with large service meshes, as described in more detail herein below.

The decoupled nature of the solution also embraces the ephemeral nature of the Container Orchestration control plane, with tolerance for frequent failure. It also allows on-demand recreation of control planes or migration of control planes to new data centers, regions, or different cloud providers without performing wide-scale reconfigurations. The simple DNS-based service discovery, along with the cryptographic certificates based on the identity framework allow a migrated workload to simply come back online.

The use of the controller pattern to "reconcile" the state (native mesh and identity framework) within each COI allows configuration changes to propagate automatically while keeping the COIs decoupled from one another.

The mesh configuration repository provides a lightweight source of truth for mesh metadata, without attempting to embed this metadata across the entities outside of the COI.

Various aspects of the methods and systems are described herein by way of examples, rather than by way of limitation. The systems and methods described herein may be implemented by hardware (e.g., general purpose and/or specialized processing devices, and/or other devices and associated circuitry), software (e.g., instructions executable by a processing device), or a combination thereof.

FIG. 1 illustrates an example distributed mesh system 100 implemented in accordance with aspects of the present disclosure. As schematically illustrated by FIG. 1, the example distributed mesh system 100 includes COIs 110A and 110B communicating to each other via the network 115, which may include one or more wide area networks (WANs) and/or local area networks (LANs) employing suitable networking technologies to enable the network level (L3) routing of network packets between COIs 110A and 110B.

Each COI 110A-110B forms, based on available mesh technologies, a corresponding independent service mesh implementing, respectively, Service A 120A and Service B 120B. In the illustrative example of FIG. 1, Service B invokes Service A and may in turn be invoked by other services or applications (not shown in FIG. 1).

While in the illustrative example of FIG. 1 only two COIs are shown, various other implementations may employ multiple COIs without limitations on their number. Various auxiliary components, including network appliances, routers, switches, firewalls, etc. may be omitted from FIG. 1 for clarity and conciseness.

Figure 2A:
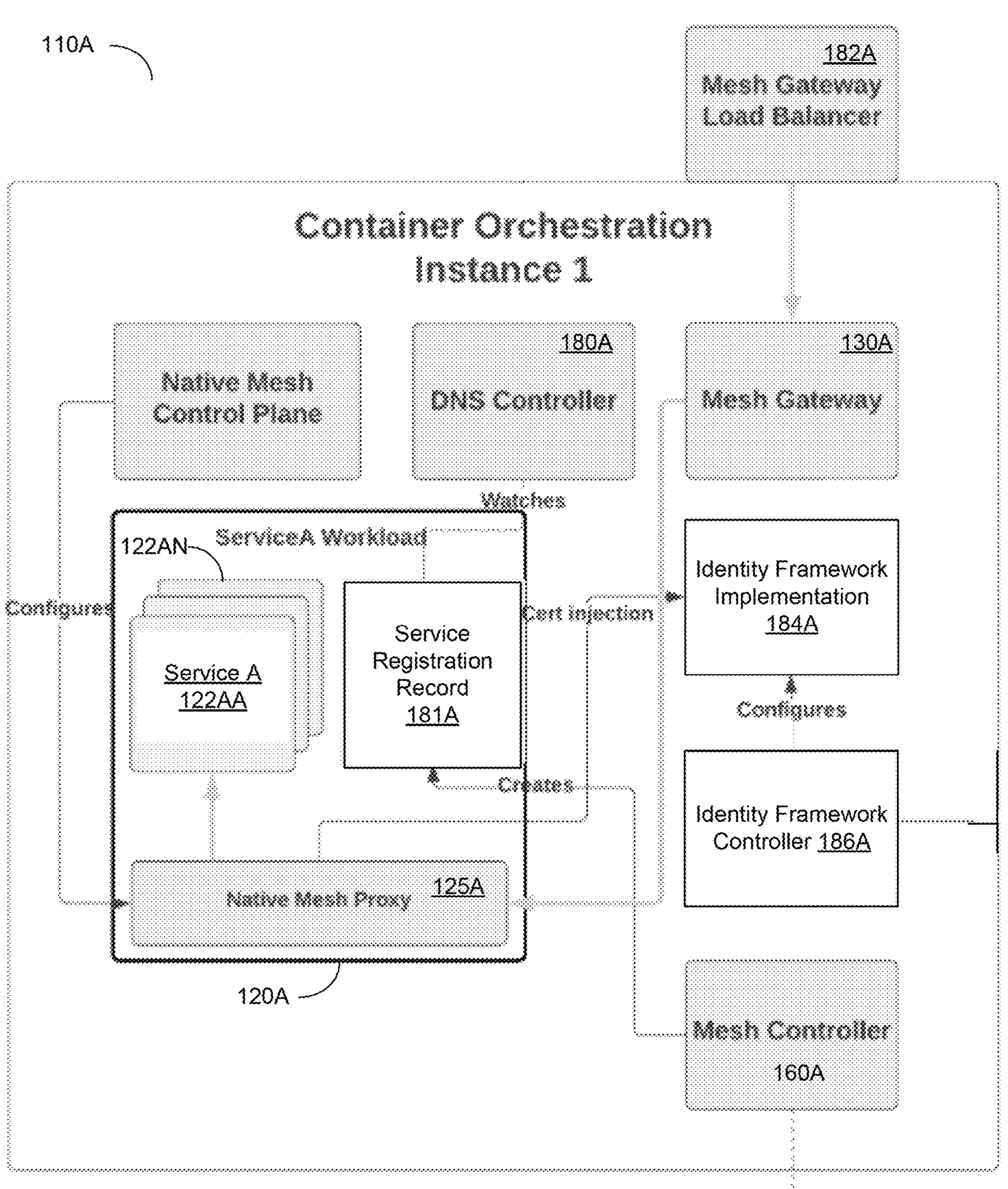
FIG. 2A illustrates an example container orchestration system (COI) 110A of FIG. 1, in accordance with aspects of the present disclosure.

As schematically illustrated by FIG. 2A, Service A includes multiple instances 122AA-122AN of Service A workload. Each instance 122AA-122AN may be represented by a corresponding container or a group of containers ("pod") running one or more software modules implementing the functionality of Service A. The instances 122AA-122AN are accessible via the native mesh proxy 125A, which intercepts the incoming requests forwarded by mesh gateway 130A. The native mesh proxy 125A validates the incoming requests and forwards a successfully validated request to one of the instances 122AA-122AN. Validating an incoming request may involve, e.g., validating the cryptographic signature of the incoming request, validating the cryptographic certificate (e.g., mTLS certificate) associated with the request, validating the request syntax, etc.

Figure 2B:
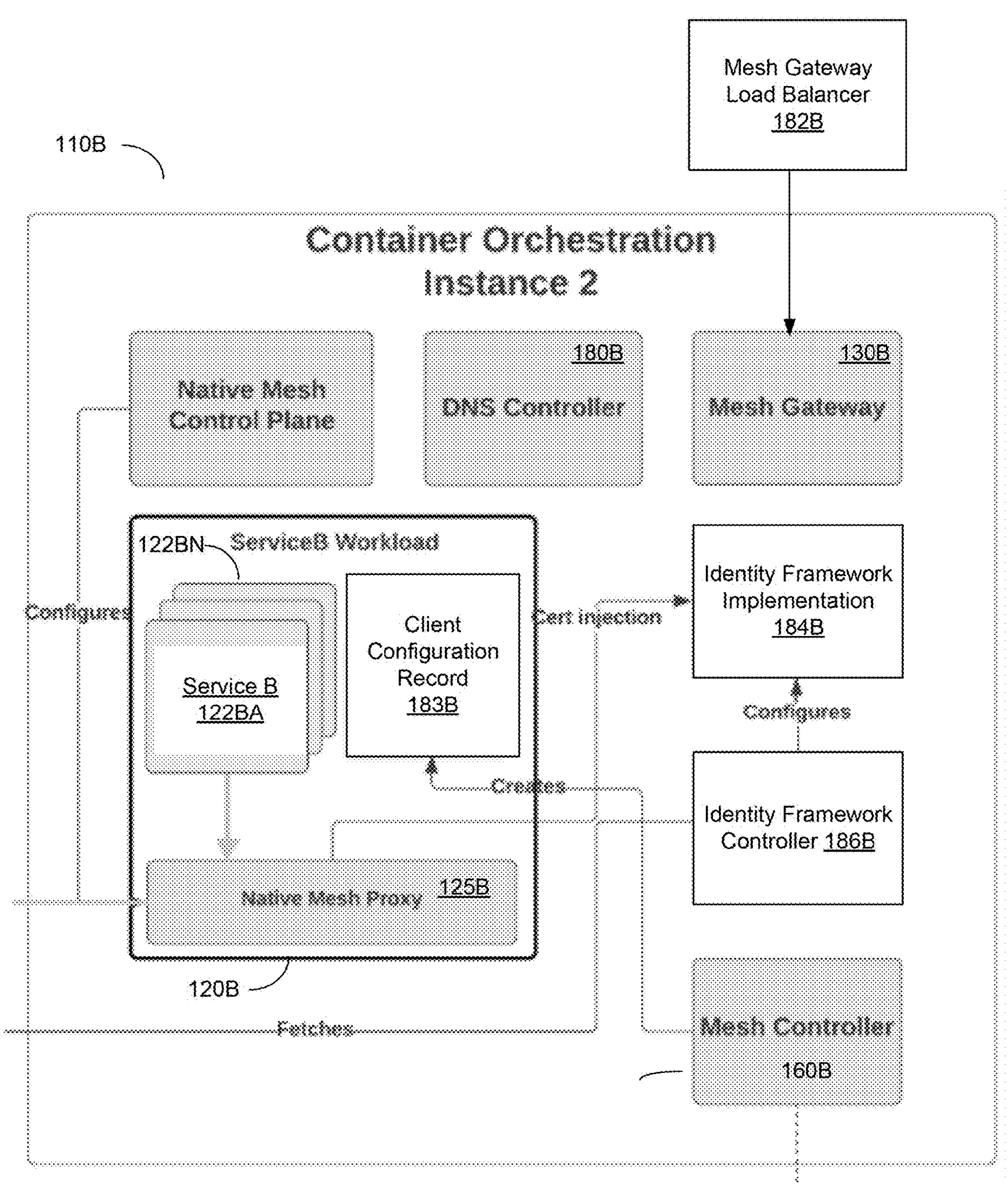
FIG. 2B illustrates an example container orchestration system (COI) 110B of FIG. 1, in accordance with aspects of the present disclosure.

As schematically illustrated by FIG. 2B, in some implementations, the native mesh proxy 125B may also intercept outgoing requests originated by the instances 122BA-122BN and forward them to their respective destinations specified by respective client configurations (e.g., "Service A Client Configuration"228).

Referring again to FIG. 1, in some implementations, the native mesh proxy 125B may also generate a client mTLS certificate 128 (e.g., via the SPIFFE Implementation) and attach it to the outgoing call 135 issued by Service B to Service A.

In some implementations, the example distributed mesh system 100 may further include a mesh configuration repository 150. In the illustrative example of FIG. 1, the mesh configuration repository 150 includes the service configuration 155A of Service A and service configuration 155B of Service B.

In some implementations, each COI 110A-110B may run a respective mesh controller 160A-160B, which may pull, from the mesh configuration repository 150, one or more service configuration records 152 reflecting configurations of services running in the COIs 110A-110B. Each service configuration record 152 may carry, for a given service:

information about the name and parameters of the service;

the downstream services that the service is allowed to call;

the upstream services that are allowed to call the service; and/or other characteristics of the service.

Based on the available workloads in the COI, each mesh controller 160A-160B may create native mesh constructs (for example, custom resource definitions) which may expose available services through the respective mesh gateway 130A-130B. A custom resource definition may describe, e.g., one or more application programming interface (API) endpoints that implement the corresponding service 120A-120B.

In some implementations, the mesh controller 160A may further create the service registration records 181A to be consumed by the Domain Naming System (DNS) controller 180A, as described in more detail below.

In some implementations, each mesh controller 160A-160B may pull, from the mesh configuration repository 150, one or more service configuration records 152 reflecting updates to service configurations in other COIs, thus becoming aware of configuration changes of other services within the example distributed mesh system 100. In the illustrative example of FIG. 1, upon pulling a mesh configuration update with respect to service 120A, mesh controller 160B may create a client configuration record 183B thus informing Service 120B of the existence and parameters of its downstream Service 120A.

Thus, the mesh controllers may facilitate automatic propagation of configuration changes across the example distributed mesh system 100, while keeping the COIs 110A0110B decoupled from each another.

In some implementations, each mesh controller 160A-160B may effectively restrict access to workloads 120A-120B based on the respective service configurations 155A-155B. In the illustrative example of FIG. 1, the mesh controller 160A retrieves definitions of allowed upstream services (e.g., service B) from the service configuration records 152 and translates the definitions into native mesh constructs (e.g., custom resource definitions) to be consumed by the mesh gateway 130A. Using the custom resource definitions, the mesh gateway 130A may only allow requests originated by service B to service A.

In some implementations, the mesh gateway may also perform cryptographic validation of service B's certificates in order to confirm the identity of the request issued by the service B. The mesh gateway may then enforce authorization (i.e., allow or deny the request) based on the identity of the calling service (e.g., service B) and its intended destination (e.g., service A)

In some implementations, a mesh controller may create one or more local mesh constructs that would restrict access to a workload to only allow incoming requests from the upstream services specified in the service configuration of the workload. Furthermore, the mesh controller may also create one or more local mesh constructs that would only allow outgoing requests originated by a given workload to services specified in the service configuration of the workload.

In an illustrative example, the service configuration 155A may specify Service B as the only allowed upstream service with respect to service A, and the service configuration 155B may specify Service A as the only downstream service with respect to service B. Accordingly, the mesh gateway 130A may restrict access to service A to incoming requests originated by service B only. Conversely, the mesh controller 160B may only allow outgoing requests originated by service B to service A.

Service registration and discovery in the example distributed mesh system 100 may be facilitated by the DNS. Each COI 110A-110B may include a respective DNS controller 180A-180B, which identifies the services to be exposed and registers corresponding DNS entries within a DNS domain associated with the example distributed mesh system 100. In some implementations, the DNS controller 180A may identify services to be exposed by detecting the service registration record 181A created by the local mesh controller 160A-160B. In the illustrative example of FIG. 2A, each DNS entry maps a name of the service to an IP address of the load balancer 182A associated with the mesh gateway 130A. In the illustrative example of FIG. 2B, each DNS entry maps a name of the service to an IP address of the load balancer 182B associated with the mesh gateway 130B.

Cross-service authentication and secure communication in the example distributed mesh system 100 may be facilitated by the identity framework implementations 184A-184B managed by the corresponding identity framework controllers 186A-186B. In the example of FIG. 1, each COI 110A-110B maintains its own trust domain. In various other implementations, two or more COIs may share a trust domain, while other COIS may reside in other trust domains. All workloads sharing a trust domain are issued identity credentials that can be verified against the root keys of that trust domain. Generally, workloads that reside in different environments (e.g., physical locations or clouds) are kept in distinct trust domains.

In an illustrative example, the identity framework implementations 184A-184B may employ Mutual Transport Layer Security (mTLS), which relies on asymmetric cryptography to prove the identity of the sender and recipient of a message, as well as assert that the message has not been viewed or modified in transit by a third party.

Accordingly, the identity framework implementations 184A-184B may attest the identity of workloads in a distributed software system at runtime based on workload-specific, short-lived, automatically rotated cryptographic keys and certificates.

For each COI 110A-110B, the corresponding identity framework controller 186A-186B may periodically pull a root cryptographic certificate for the COI from a root certificate authority 170A. Based on the root certificate, certificates for other entities within the COI may be issued. Each of the identity framework controllers 186A-186B may periodically refresh its list of globally trusted certificate authorities 170A and 170-170N for the example distributed mesh system 100.

In the illustrative example of FIG. 1, an example configuration and invocation of ServiceA by ServiceB is shown. ServiceB specifies ServiceA as a downstream service, which is reflected by a service configuration record 152. Conversely, ServiceA specifies ServiceB as an allowed upstream service, which in turn is reflected by another mesh configuration record. The call originated by Service B passes through the native mesh proxy 132B, leaves COI 110B, is routed by physical L3 routing via the network 115, passes through the mesh gateway load balancer 182A and the mesh gateway 130A, through the native mesh proxy 132A, and to one of ServiceA workloads 122AA-122AN. The return may traverse the same path in the reverse direction (except for possible different L3 route via the network 115).

Figure 3:
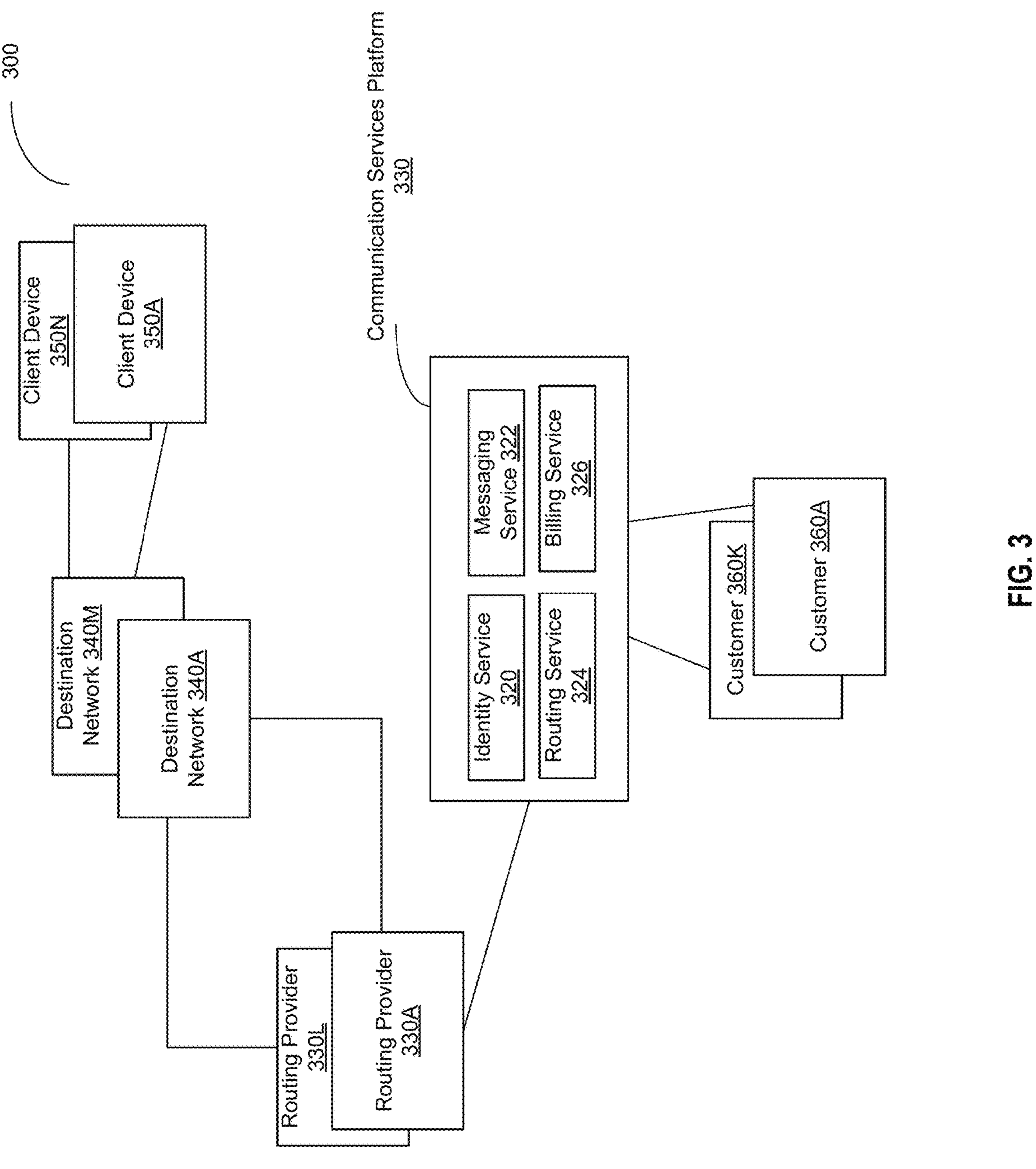
FIG. 3 illustrates an example distributed system architecture 300 supporting a communication services platform 330 implemented in accordance with aspects of the present disclosure.

FIG. 3 illustrates an example distributed system architecture 300 supporting a communication services platform 330 implemented in accordance with aspects of the present disclosure. The communication services platform 330 may employ one or more general purpose or specialized computing devices (such as servers), data stores (e.g., hard disks, memories, databases), networks, other hardware components that are utilized to run one or more software services, such as message routing services, and various middleware and operating systems. The computing devices may be disposed in one or more physical locations, which may include geographically distributed physical locations.

In some implementations, communication services platform 330 may implement a Software as a Service (SaaS) platform that provides messaging services for forwarding messages (such as SMS messages, MMS messages, and/or IM messages) generated by multiple message-originating entities (e.g., customers 360A-360K of the communication services platform) to client devices 350A-350N via a pool of message routing providers 330A-330L serving respective destination networks 340A-340M. In some implementations, the communication services platform 330 may further provide various other services, including voice services, electronic mail services, video services, and/or chat messaging services.

The communication services platform 330 may be accessed (e.g., via one or more application programming interface (API) endpoints) by customer computing devices 360A-360K via a communication network, which can include one or more public networks (e.g., the Internet) and/or private networks (e.g., a local area network (LAN) or wide area network (WAN)) utilizing various physical and datalink layer technologies, such as wired networks (e.g., Ethernet network), wireless networks (e.g., an 802.33 network or a Wi-Fi network), and/or cellular networks (e.g., a Long Term Evolution (LTE) network).

A customer computing device 360A-360K may be represented by a general purpose or specialized computing device implementing a server running one or more applications that utilize one or more messaging technologies (such as Short Message Service (SMS) or Multimedia Messaging Service (MMS)) for communicating with client applications running on client devices 350A-350N.

A client device 350A-350N may be represented by a general purpose or specialized computing device, such as a mobile communication device (e.g., a smartphone), a portable computer (PC), a wearable device (e.g., smart watch, smart glasses, etc.), a network-connected television set, a smart appliance (e.g., a video doorbell), etc. In some implementations, a client device 350 may run one or more client applications that communicate (e.g., using one or more messaging technologies) with one or more customer computing device 360A-360K. In various example use cases, a client application running on a client device 350 may be a web application or a standalone application implementing a graphical user interface (GUI).

In some implementations, an API endpoint exposed by the communication services platform 330 may be accessed via a resource identifier, such a universal resource identifier (URI). The API endpoint may receive requests and return responses from/to customers 360A-360K. In various implementations, the API endpoint may implement, e.g., a REST (Representational State Transfer) API, a GraphQL API, a SOAP (Simple Object Access Protocol) API accessible via HTTP (Hypertext Transfer Protocol)/HTTPS (Hypertext Transfer Protocol Secure) or other suitable application layer protocols.

In some implementations, the API endpoint may be used for initiating a messaging request that may include one or more destination identifiers (e.g., recipient phone numbers), the message content (e.g., text and/or multimedia content), and the origin identifier (e.g., a sender phone number). In some implementations, outgoing messages may be automatically assigned an origin identified that is associated with the customer account.

Message routing providers 330A-330L that are utilized by a given communication services platform may employ different communication technologies, networks, and/or configurations. In an illustrative example, each message routing provider 330 may route the incoming messages to specified destinations via one or more messaging gateways (e.g., SMS gateways).

The communication services platform 330 may dynamically allocate customer-originating messages to the available message routing providers for a specified destination network (e.g., identified by the Mobile Country Code (MCC) and/or Mobile Network Code (MNC)). The destination network identifier(s) may be derived from the destination phone number or other destination endpoint identifier.

In an illustrative example, the communication services platform 330 may identify, in an MCC/MNC directory, a record mapping at least a part of the destination phone number to the corresponding destination network (identified by the MCC and/or MNC). Then, the communication services platform 330 may select, from the pool of available message routing providers, a subset of message routing providers 330A-330L that serve the identified destination network.

In some implementations, the communication services platform 330 may employ the distributed mesh architecture of FIG. 1 in order to implement one or more services, including, e.g., the identity service 320, messaging service 322, routing service 324, and billing service 326. The identity service 320 may provide user authentication and related functionality. The routing service 324 may select the routes utilized for message delivery. The messaging service 322 may provide message delivery over the selected routes.

The billing service 326 may track the usage of other platform services and generate invoices to platform customers.

In situations in which the systems discussed here collect personal information about users, or may make use of personal information, the users may be provided with an opportunity to control whether the communication services platform 330 collects user information, or to control whether and/or how to receive content from the communication services platform 330 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the communication services platform 330.

Figure 4:
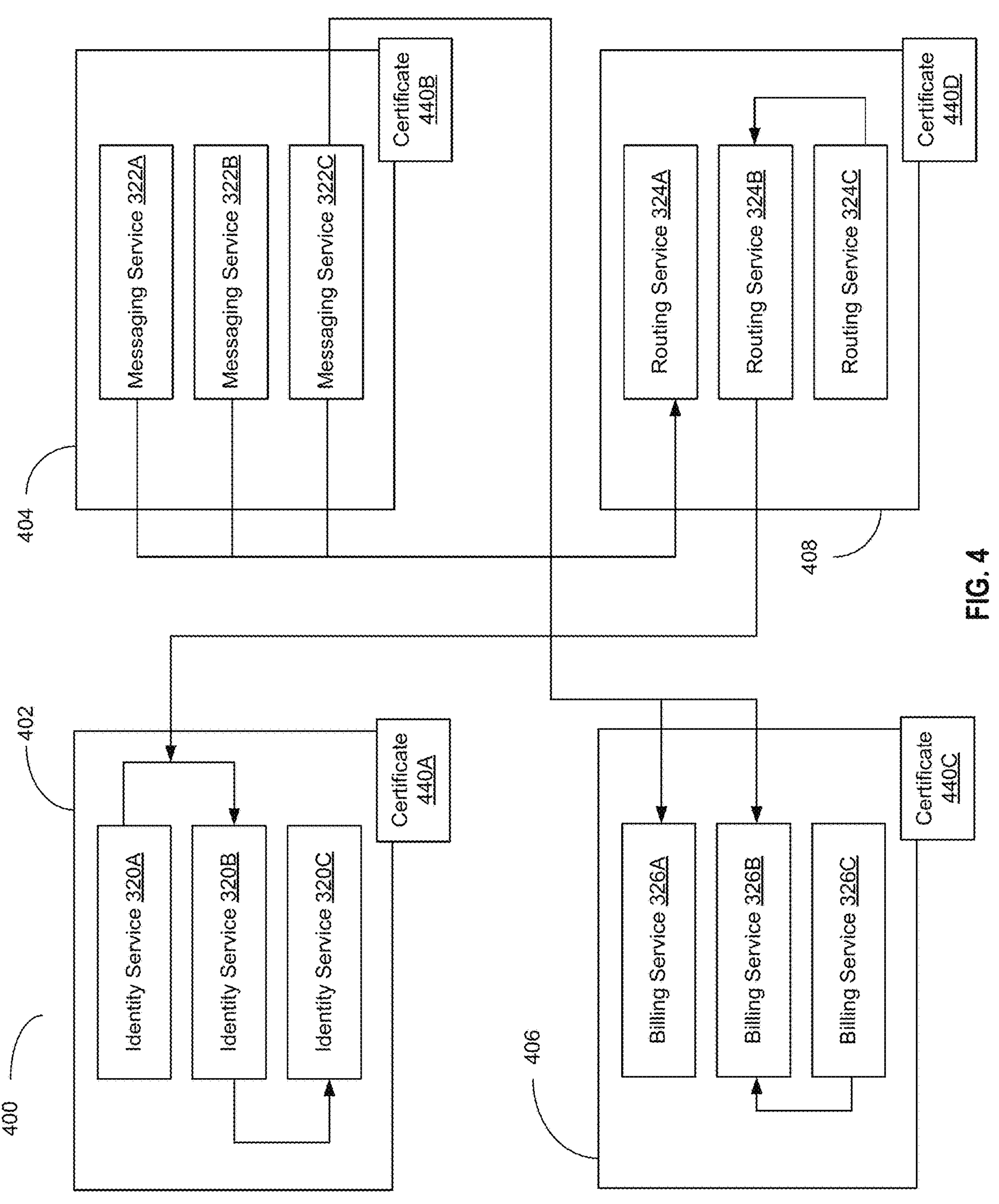
FIG. 4 schematically illustrates an example distributed mesh system 300 implementing several services of the communication services platform 330 of FIG. 3, in accordance with aspects of the present disclosure.

FIG. 4 schematically illustrates an example distributed mesh system 300 implementing several services of the communication services platform 330 of FIG. 3, in accordance with aspects of the present disclosure. Each of the identity service 320, messaging service 322, routing service 324, and billing service 326 resides into a respective trust domain implemented by a respective COI 402, 404, 406, 408. Accordingly, each trust COI is issued with a respective cryptographic certificate 440A-440D which may be utilized for implementing Mutual Transport Layer Security (mTLS)-based authentication and encryption.

As schematically shown in FIG. 4, some service-to-service calls are within a trust domain (e.g., identity service 320B to identity service 320C). These calls may accomplish certain internal goals of the trust domain's functional area. Other service-to-service calls are across trust domains (e.g., messaging service 322A to routing service 324A). These calls may accomplish certain higher-level integrated use cases, or to access a centralized common service.

Figure 5:
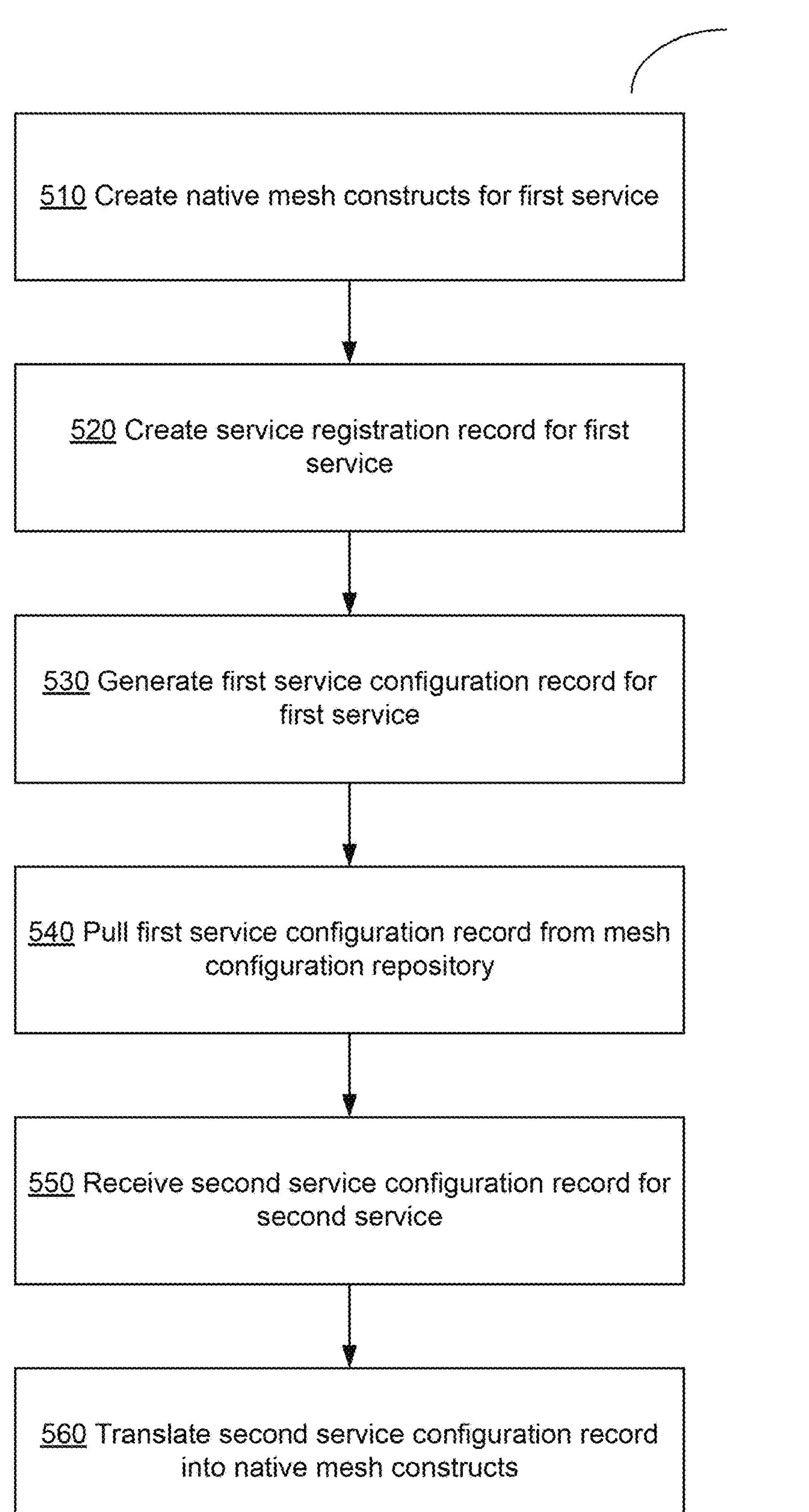
FIG. 5 is a flow diagram of an example method propagating mesh configuration updates by a mesh controller operating in accordance with aspects of the present disclosure.

FIG. 5 is a flow diagram of an example method 500 of propagating mesh configuration updates by a mesh controller operating in accordance with aspects of the present disclosure. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 500 is performed by a mesh controller 160A-160B of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel.

Additionally, one or more operations may be omitted in some implementations. Thus, not all illustrated operations are required in every implementation, and other process flows are possible.

At operation 510, the mesh controller of a first COI of a distributed computing system creates, for a first service running in the COI, one or more native mesh constructs (for example, custom resource definitions) which expose the service to other services running in other COIs of the distributed computing system.

At operation 520, the mesh controller creates, for the first service, a service registration record to be consumed by a DNS controller 180.

At operation 530, the mesh controller generates a first service configuration record for the first service. The first service configuration record may specify information about the name and parameters of the service; the downstream services that the service is going to call; the upstream services that are allowed to call the service; and/or other characteristics of the service. In an illustrative example, the first service configuration record may specify a second service running in a second COI of the distributed computing system as an allowed upstream service of the first service.

At operation 540, the mesh controller receives the first service configuration record from the mesh configuration repository, as described in more detail herein above.

At operation 550, the mesh controller receives a second service configuration record of the second service from the mesh configuration repository.

At operation 560, the mesh controller translates the second service configuration record into one or more native mesh constructs (e.g., custom resource definitions) which may be utilized for allowing upstream service calls to the first service.

Figure 6:
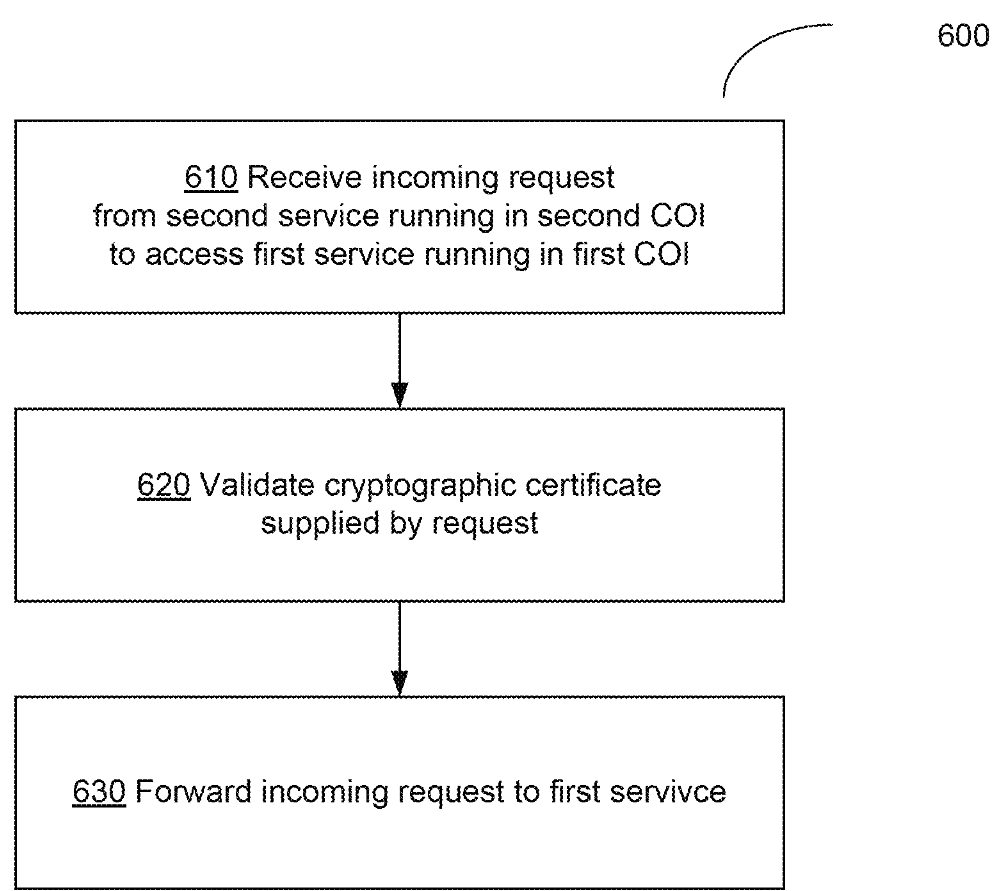
FIG. 6 is a flow diagram of an example method of implementing access control by a native mesh proxy operating in accordance with aspects of the present disclosure.

FIG. 6 is a flow diagram of an example method 600 of implementing access control by a native mesh proxy operating in accordance with aspects of the present disclosure. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 600 is performed by a native mesh proxy 125A-125B of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 610, the mesh proxy running in a first COI receives an incoming request from a second service running in a second COI to access a first service running in the first COI.

At operation 620, the mesh proxy validates, via the identity framework implementation, a cryptographic certificate supplied by the incoming request.

Responsive to successfully validating, at operation 620, the cryptographic certificate supplied by the incoming request, the mesh proxy, at operation 630, forwards the incoming request to the first service.

Figure 7:
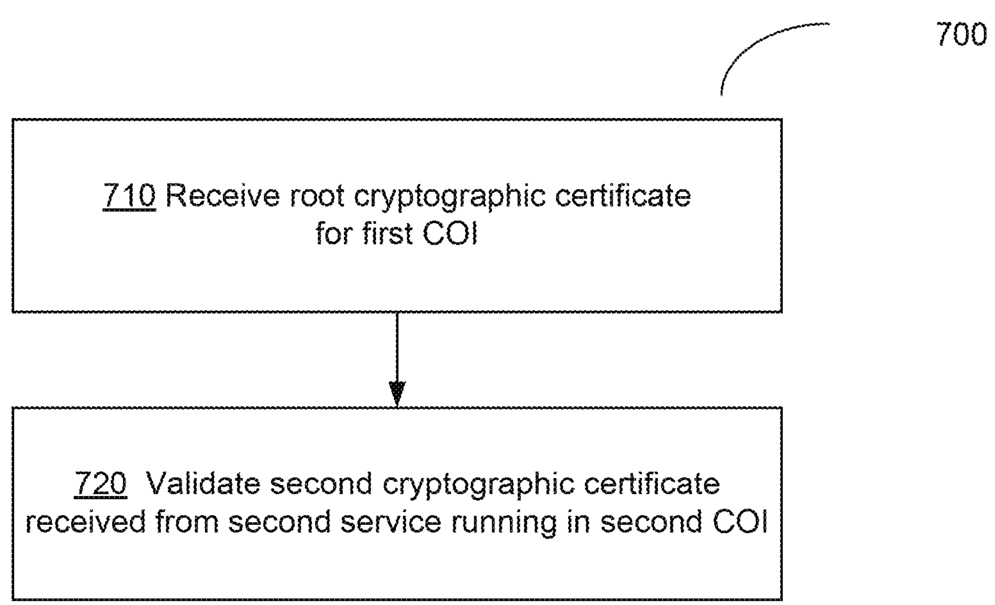
FIG. 7 is a flow diagram of an example method of maintaining a trust domain by an identity framework controller operating in accordance with aspects of the present disclosure.

FIG. 7 is a flow diagram of an example method 700 of maintaining a trust domain by an identity framework controller operating in accordance with aspects of the present disclosure. The method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 700 is performed by an identity framework controller 186A-186B of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel.

Additionally, one or more operations may be omitted in some implementations. Thus, not all illustrated operations are required in every implementation, and other process flows are possible.

At operation 710, the identity framework controller of a first COI receives a first root cryptographic certificate for the first COI from a root certificate authority.

At operation 720, the identity framework controller validates, by the root certificate authority, a second cryptographic certificate received from a second service running in a second COI. In some implementations, the second cryptographic certificate may belong to the mesh gateway of the second COI rather than to the second service itself, which would be sufficient for performing a cryptographic handshake.

Figure 8:
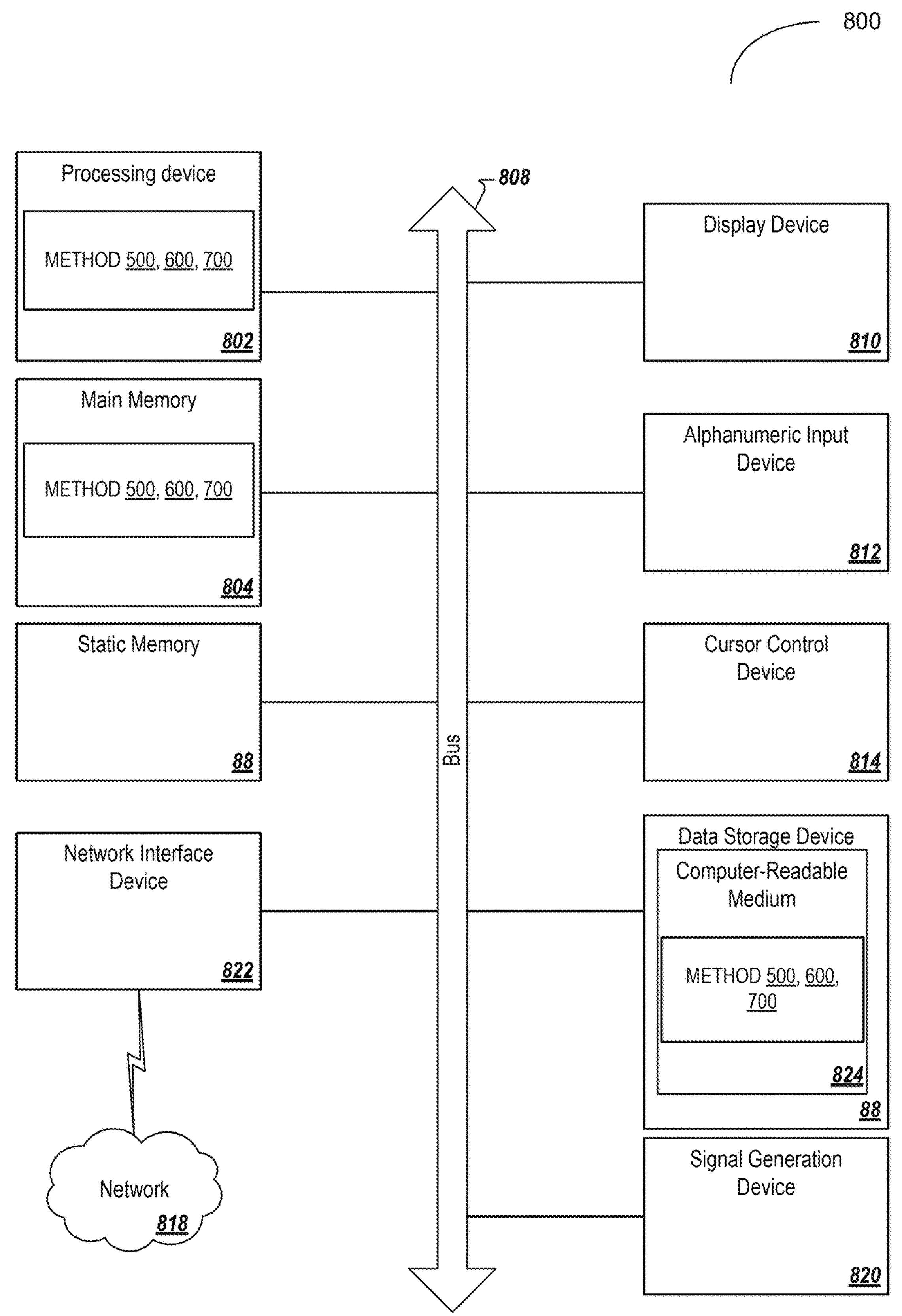
FIG. 8 is a block diagram illustrating an exemplary computer system, in accordance with some implementations of the disclosure.

FIG. 8 is a block diagram illustrating an exemplary computer system 800, in accordance with an implementation of the disclosure. The computer system 800 executes one or more sets of instructions that cause the machine to perform any one or more of the methodologies discussed herein. Set of instructions, instructions, and the like may refer to instructions that, when executed by computer system 800, cause computer system 800 to perform one or more operations of example distributed mesh system 100 of FIG. 1. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 808 (e.g., flash memory, static random access memory (SRAM), etc.), and a data storage device 818, which communicate with each other via a bus 808.

The processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions implementing various components of the example distributed mesh system 100 for performing the operations discussed herein (e.g., methods 500, 600, and 700).

The computer system 800 may further include a network interface device 822 that provides communication with other machines over a network 818, such as a local area network (LAN), an intranet, an extranet, or the Internet. The computer system 800 also may include a display device 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a non-transitory computer-readable storage medium 824 on which is stored the sets of instructions implementing various components of the example distributed mesh system 100 for performing the operations discussed herein (e.g., methods 500, 600, and 700). The sets of instructions implementing various components of the example distributed mesh system 100 may also reside, completely or at least partially, within the main memory 804 and/or within the processing device 802 during execution thereof by the computer system 800, the main memory 804 and the processing device 802 also constituting computer-readable storage media. The sets of instructions may further be transmitted or received over the network 818 via the network interface device 822.

While the example of the computer-readable storage medium 824 is shown as a single medium, the term "computer-readable storage medium" may include a single medium or multiple media (e.g., a centralized or distributed database, and/or associated caches and servers) that store the sets of instructions. The term "computer-readable storage medium" may include any medium that is capable of storing, encoding or carrying a set of instructions for execution by the machine and that causes the machine to perform any one or more of the methodologies of the disclosure. The term "computer-readable storage medium" may include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A communication services platform implemented by a distributed computing system comprising a plurality of container orchestration instances (COIs), wherein a first COI of the plurality of COIs comprises:

a plurality of running instances of a first service accessible via a first mesh proxy; and a first mesh controller configured to:

receive a first service configuration record for the first service, receive a second service configuration record for a second service running in a second COI of the plurality of COIs, translate the second service configuration record into one or more custom resource definitions to allow upstream service calls by the second service to the first service;

wherein the first mesh proxy is configured to:

receive an incoming request from the second service to access the first service, validate a cryptographic certificate supplied by the incoming request, and forward the incoming request to the first service.

2. The communication services platform of claim 1, wherein the first COI further comprises a first identity framework controller configured to:

receive a first root cryptographic certificate for the first COI from a root certificate authority; and validate, by the root certificate authority, a second cryptographic certificate received from the second service.

3. The communication services platform of claim 1, wherein the first mesh controller is further configured to:

create, for the first service, one or more custom resource definitions to expose the first service to other services of the distributed computing system.

4. The communication services platform of claim 1, wherein the first mesh controller is further configured to:

create, for the first service, a service registration record to be consumed by a domain naming system (DNS) controller of the first COI.

5. The communication services platform of claim 1, wherein the first mesh controller is further configured to:

generate the first service configuration record for the first service, wherein the first service configuration record comprises one or more custom resource definitions of custom resources of the first COI.

6. The communication services platform of claim 1, further comprising a mesh gateway configured to:

validate an incoming request originated by the second service.

7. The communication services platform of claim 1, further comprising a DNS controller configured to:

register a DNS entry for the first service in a DNS domain associated with the distributed computing system.

8. The communication services platform of claim 1, wherein the first service implements one of: an identity service, a billing service, a routing service, or a messaging service.

9. The communication services platform of claim 1, wherein the plurality of running instances of the first service comprise at least one of: a first instance running on a physical node or a second instance running on a virtual node.

10. A method, comprising:

receiving, by a first mesh controller of a first container orchestration instance (COI) of a plurality of COIs of a distributed computing system, a first service configuration record for a first service running in the first COI;

receiving a second service configuration record for a second service running in a second COI of the plurality of COIs;

translating the second service configuration record into one or more custom resource definitions to allow upstream service calls by the second service to the first service;

receiving an incoming request from the second service to access the first service;

validating a cryptographic certificate supplied by the incoming request; and forwarding the incoming request to the first service.

11. The method of claim 10, further comprising:

creating, for the first service, one or more custom resource definitions to expose the first service to other services of the distributed computing system.

12. The method of claim 10, further comprising:

creating, for the first service, a service registration record to be consumed by a domain naming system (DNS) controller of the first COI.

13. The method of claim 10, further comprising:

generating the first service configuration record for the first service.

14. The method of claim 10, wherein the first service configuration record specifies at least one of: a downstream service for the first service or an upstream service for the first service.

15. A non-transitory computer-readable storage medium comprising executable instructions that, responsive to execution by a processing device of a first mesh controller of a first container orchestration instance (COI) of a plurality of COIs of a distributed computing system, cause the processing device to:

receive a first service configuration record for a first service running in the first COI;

receive a second service configuration record for a second service running in a second COI of the plurality of COIs;

translate the second service configuration record into one or more custom resource definitions to allow upstream service calls by the second service to the first service;

receive an incoming request from the second service to access the first service;

validate a cryptographic certificate supplied by the incoming request; and forward the incoming request to the first service.

16. The non-transitory computer-readable storage medium of claim 15, further comprising executable instructions that, responsive to execution by the processing device, cause the processing device to:

create, for the first service, one or more custom resource definitions to expose the first service to other services of the distributed computing system.

17. The non-transitory computer-readable storage medium of claim 15, further comprising executable instructions that, responsive to execution by the processing device, cause the processing device to:

create, for the first service, a service registration record to be consumed by a domain naming system (DNS) controller of the first COI.

18. The non-transitory computer-readable storage medium of claim 15, further comprising executable instructions that, responsive to execution by the processing device, cause the processing device to:

generate the first service configuration record for the first service.

19. The non-transitory computer-readable storage medium of claim 15, wherein the first service configuration record specifies at least one of: a downstream service for the first service or an upstream service for the first service.

* * * * *